Sept. 6, 1955  H. C. HEBERT  2,717,089
APPARATUS FOR MANUALLY BULK LOADING CANS
INTO FREIGHT CARS AND OTHER COMPARTMENTS
Filed Dec. 23, 1953  4 Sheets-Sheet 2
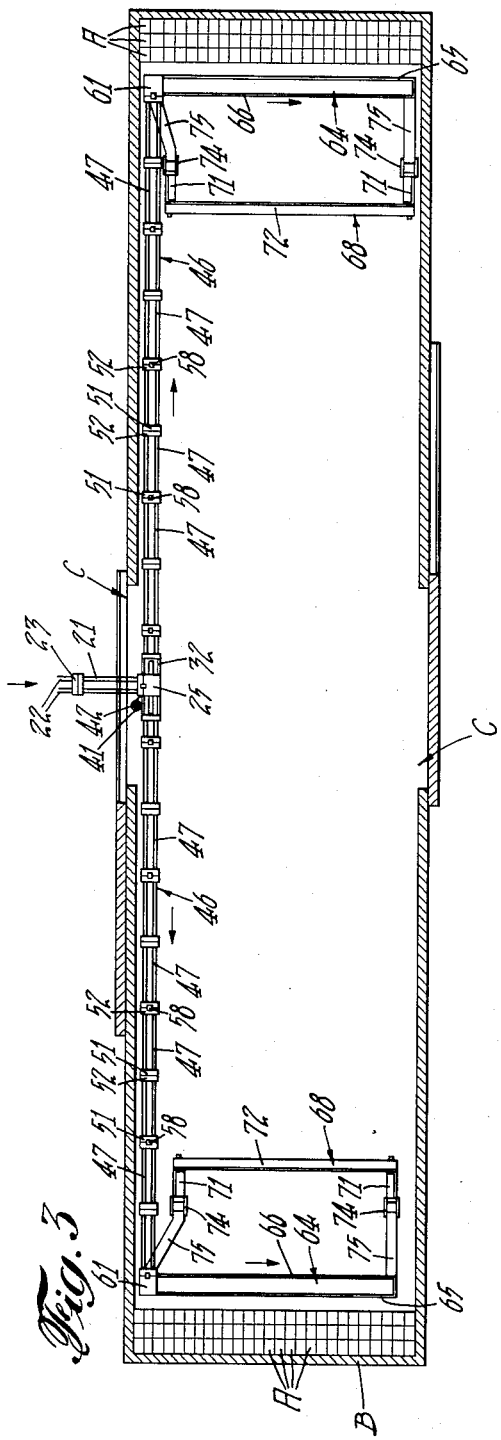
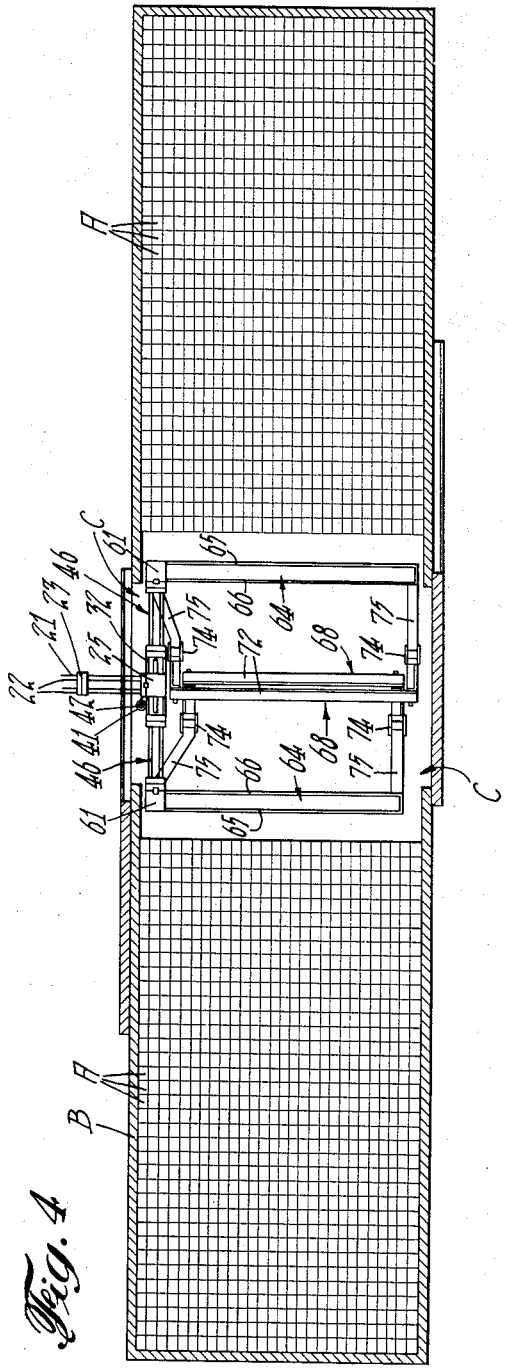
INVENTOR.
HAROLD C. HEBERT
BY
ATTORNEYS Sept. 6, 1955            H. C. HEBERT           2,717,089
APPARATUS FOR MANUALLY BULK LOADING CANS
INTO FREIGHT CARS AND OTHER COMPARTMENTS
Filed Dec. 23, 1953                           4 Sheets-Sheet 3
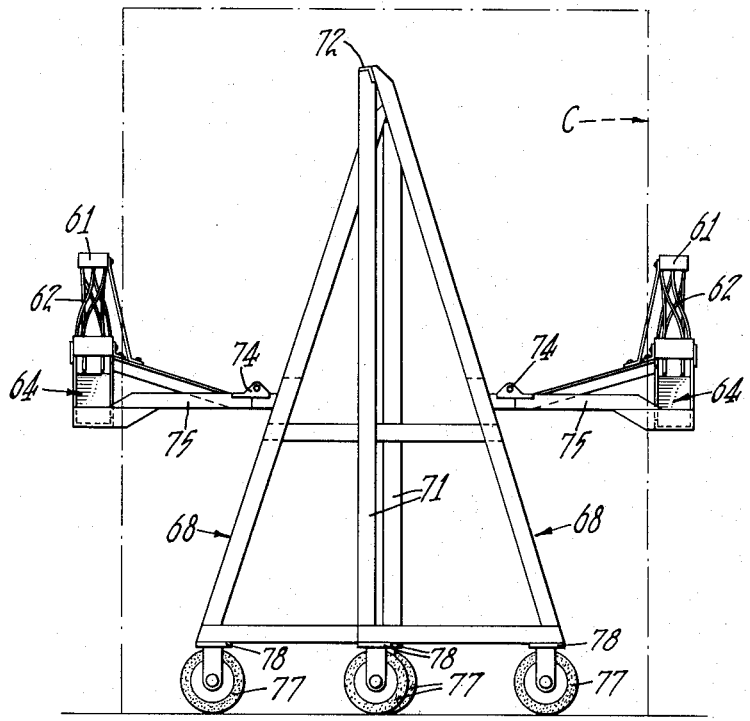
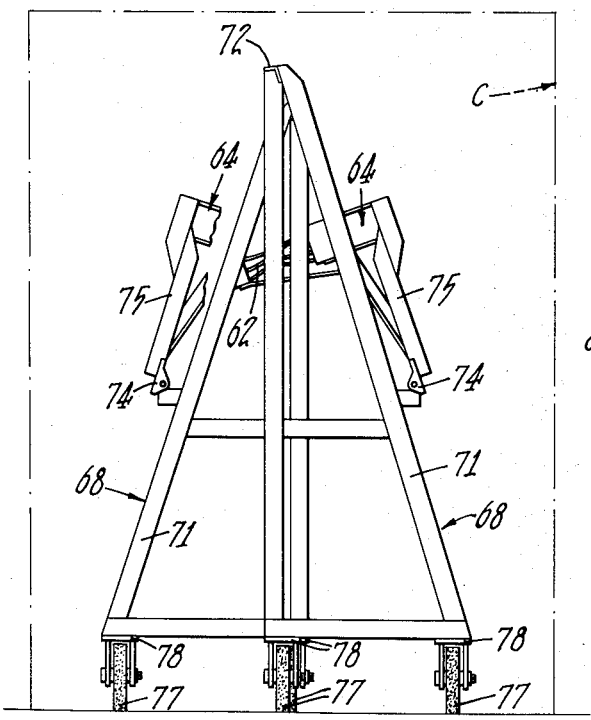
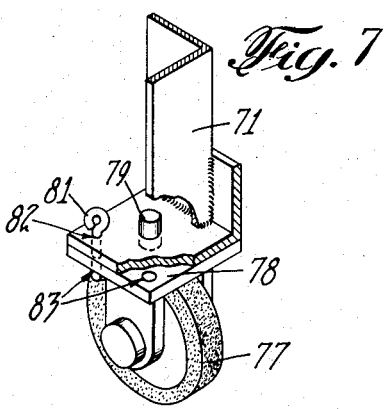
INVENTOR.
HAROLD C. HEBERT
ATTORNEYS Sept. 6, 1955 H. C. HEBERT 2,717,089
APPARATUS FOR MANUALLY BULK LOADING CANS
INTO FREIGHT CARS AND OTHER COMPARTMENTS
Filed Dec. 23, 1953 4 Sheets-Sheet 4
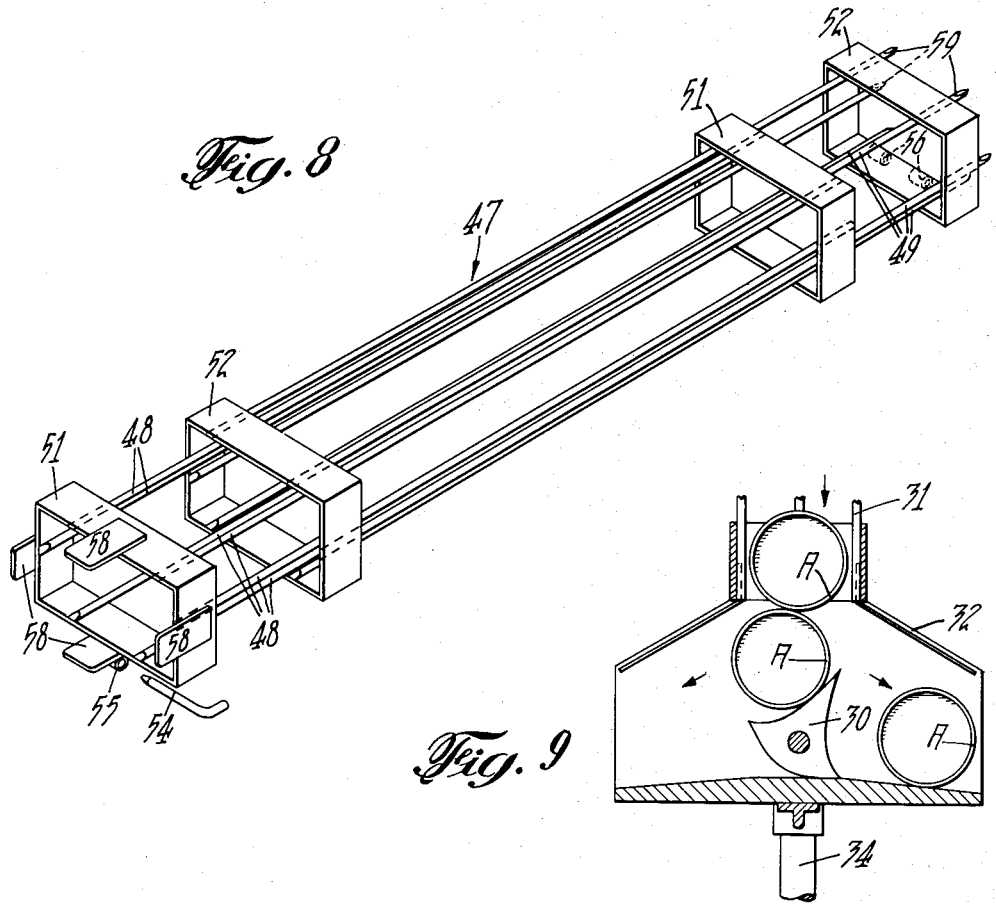
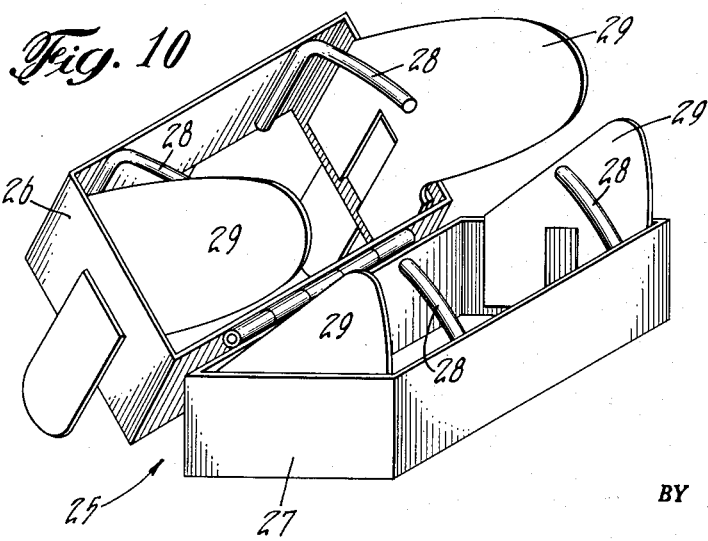
INVENTOR.
HAROLD C. HEBERT
BY
ATTORNEYS

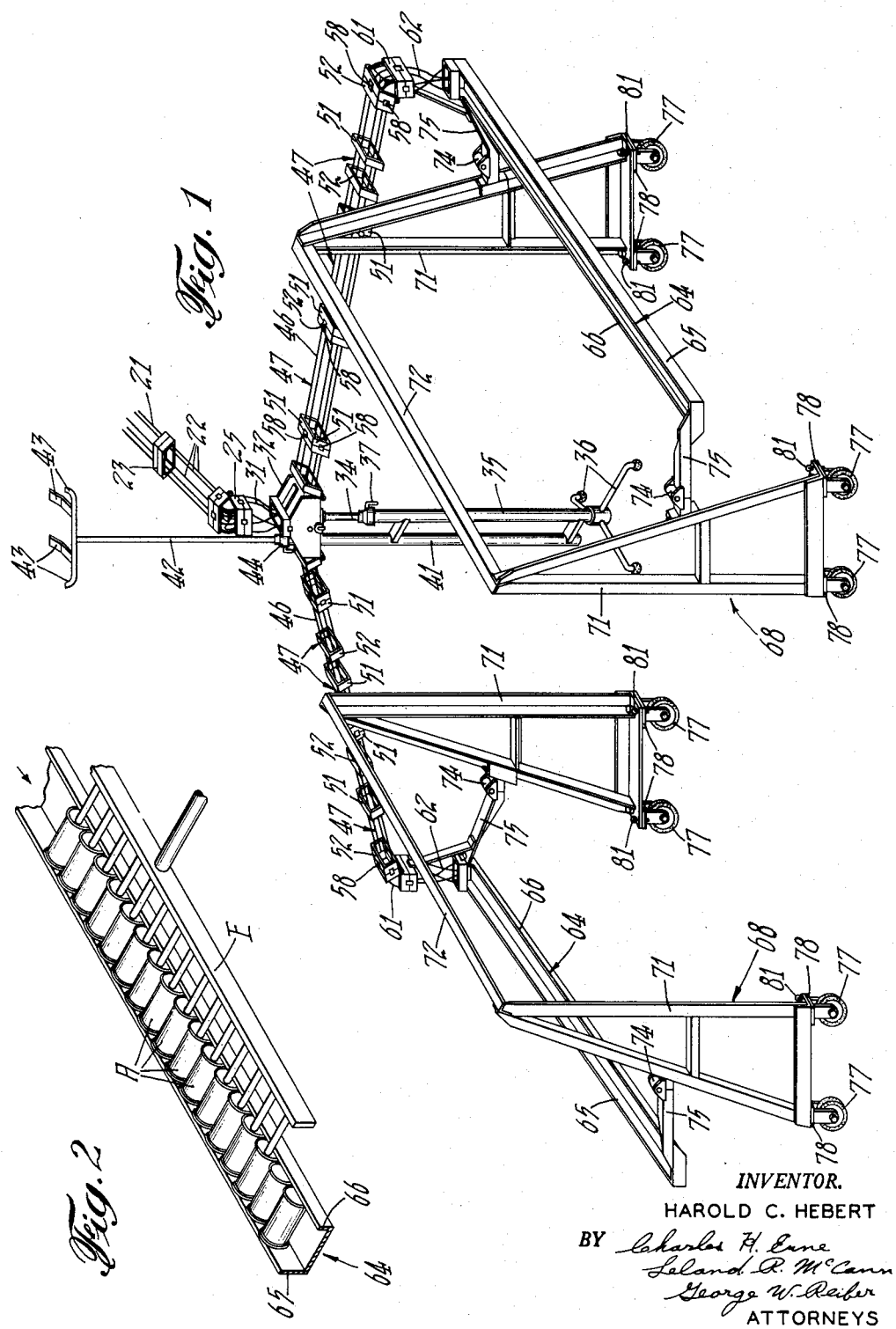

United States Patent Office 2,717,089
Patented Sept. 6, 1955

2,717,089

APPARATUS FOR MANUALLY BULK LOADING CANS INTO FREIGHT CARS AND OTHER COMPARTMENTS

Harold C. Hebert, Tampa, Fla., assignor to American Can Company, New York, N. Y., a corporation of New Jersey Application December 23, 1953, Serial No. 400,015

8 Claims. (Cl. 214—83.26)

The present invention relates to an apparatus for manually bulk loading sheet metal cans or containers into freight cars or other compartments or bins or restricted spaces for shipment or storage and has particular reference to a portable apparatus for conveying the cans to a convenient loading position within the car or compartment so that an operator may readily move the apparatus into desired positions and stack the cans in an orderly arrangement in the car or compartment with a minimum of effort.

In the shipment or storage of empty cans in bulk, the cans are stacked in orderly superimposed rows so as to occupy the least space and to facilitate handling during unloading. Although various automatic machines have been designed to stack cans for this purpose none has as yet been successfully used and none has been designed or developed which can stack them as securely as a manual operator. One reason for this is the variance in widths and heights of freight cars and compartments and restricted entrance openings thereto such as doorways, which makes it difficult to build a machine which will satisfy all requirements. Another reason is that the cans have flanges and end seams which present problems in stacking cans on top of each other in such a manner that the stack will remain upright in place without toppling over. In manual loading, the stack is built up by locking the flanges of cans in alternate rows over the tops of the cans in the between rows so that more truly vertical and hence more stable stacks are formed.

In order to supply the cans to the operator for stacking, they usually are conveyed into the car by a runway that projects into the doorway of the car. In some cases the runway is extended along the inner face of the side wall of the car. The operator lifts the cans off the runway with a straight pronged fork, which accommodates approximately two dozen cans, and carries them to the end of the car where he builds up the stack in rows extending transversely of the car. This requires extensive walking on the part of the operator from one end of the car to the center and is conducive to fatigue and spoilage of cans by dropping them during such handling. It has been estimated that an operator working in this old fashion way walks as much as six miles in loading one freight car. This excessive walking slows down the loading time to such an extent that machines which feed the cans into the conveyors must often cease operation with the result that lost production has been estimated to average tens of thousands of cans per day.

An object of the instant invention is the provision of an apparatus which is designed to overcome these inefficient efforts and motions and time losses and which features a loading tray adapted to fit any width of freight car or compartment of comparable dimensions, which may be arranged transversely of the car in an unobstructed position in front of a manual operator so that the operator can readily lift the cans from the tray and stack them in front of the tray in transverse rows in the end of the car without undue walking and other physical movements.

Another object is the provision of such a car loading apparatus which is simple and lightweight in construction and is portable so that it may be readily rolled into convenient positions by the operator as the stacking of the cans progresses in order to facilitate handling of the cans in an easy and rapid manner.

Another object is the provision of such an apparatus wherein loading of both ends of a freight car may be effected simultaneously by one operator working in each end of the car.

Another object is the provision of such an apparatus wherein parts of the apparatus may be telescoped within each other as the ends of the car become filled and space becomes restricted and stacking progresses near the doorway of the car, so that cars may be filled to capacity, leaving only the minimum space required at the doorway to gain entrance to the car for unloading.

Another object is the provision of such an apparatus which is readily adjustable to properly feed cans to the trays and to provide for compactness of the apparatus for passage through various restricted widths of door openings and the like.

Numerous other objects and advantages of the invention will be apparent as it is better understood from the following description, which, taken in connection with the accompanying drawings, discloses a preferred embodiment thereof.

Referring to the drawings:

Fig. 1 is a perspective view of an apparatus embodying the instant invention for manually bulk loading cans into freight cars and other compartments, parts being broken away;

Fig. 2 is an enlarged fragmentary perspective view of the apparatus shown in Fig. 1, the view illustrating how cans are removed by a fork for stacking;

Figs. 3 and 4 are reduced scale plan views of the apparatus of Fig. 1 in use in a freight car, Fig. 3 showing the car partially filled at opposite ends with cans and Fig. 4 showing both halves of the car nearly filled;

Figs. 5 and 6 are enlarged end views of the apparatus illustrating how rack portions of the apparatus can be telescoped one within the other for passage through a narrow doorway of a car or other confined space;

Fig. 7 is an enlarged perspective view of a roller detail utilized in the apparatus; parts broken away;

Fig. 8 is an enlarged perspective detail of telescoping runway sections used in the apparatus;

Fig. 9 is an enlarged sectional view through a can divider used in the apparatus, with parts broken away; and Fig. 10 is an enlarged perspective detail of a hinged runway section used in the apparatus.

As a preferred or exemplary embodiment of the invention the drawings disclose an apparatus for manually bulk loading empty cylindrical sheet metal cans or containers A (Fig. 2) into freight cars B (Figs. 3 and 4) and other compartments of comparable dimension having doorways C through which the cans A are passed for manually stacking by an operator in the ends of the car in horizontal rows extending transversely of the car as shown in Fig. 3.

The cans to be loaded into freight cars for shipping are received from any suitable source of supply, such as from storage bins in a warehouse or direct from can making machines in a factory and are conveyed to the loading platform through a system of can elevators and runways which permit the cans to roll on their sides in a substantially continuous procession.

In such an apparatus, the rolling cans A are received from the can conveyor system through an enclosed runway 21 (Fig. 1) defined by a plurality of guide rails 22 arranged to support and guide the rolling cans. The rails 22 are held in place at intervals along their lengths by tie rings 23 which surround the runway. At its can entrance end, the runway 21 is connected into the can conveyor system to receive the cans therefrom. The runway extends into the freight car B through one of its doorways C and at its discharge end is connected to an enclosed hingeable elbow section 25 which permits of raising and lowering the discharge end of the runway.

The hingeable elbow section 25 (see also Fig. 10) preferably comprises a pair of rectangular shaped tie rings 26, 27 which along one side are hinged together as shown. The rings are shown in wide open relation to show their inner parts. One of these tie rings 26 is secured to the discharge end of the runway 21 while the other ring 27 is secured to a continuing receiving runway. Inside the tie rings, short curved overlappable guide rails 28 and overlappable side plates 29 are provided to guide the rolling cans through the elbow section. By means of this elbow section 25 the rolling cans A are guided through a short arcuate path of travel from one runway to another.

In the instant apparatus the lower tie ring 27 of the elbow section 25 is secured to a conventional vertically disposed can twister section 31 (Fig. 1) which comprises a plurality of guide bars twisted to turn the rolling cans through an angle of 90 degrees. The lower end of the twister section 31 is attached to a conventional can divider 32 (see also Fig. 9) which is disposed just inside the freight car at its doorway C for directing alternate cans in opposite directions toward the ends of the car. The divider 32 may be of any well known construction such as the one disclosed in United States Patent 1,236,389 issued August 14, 1917, to A. M. Augensen on "Can Conveyor and Distributor." In such a divider a freely movable pivotally mounted rocker element 30 in the divider 32 under the lower end of the twister runway 31 is engaged and rocked by cans as they enter the divider and by reason of its free mounting shifts with each passing can and thereby conducts alternate cans in opposite directions.

The divider 32 is supported on a vertically disposed support bar 34 (Fig. 1) which is adjustably carried in a support sleeve 35 having at its lower end a plurality of spider feet 36 which rest on the floor of the freight car B. A clamp ring 37 attached to the upper end of the sleeve and surrounding the support bar 34 provides for adjustment and clamping of the bar 34 in position to control the height of the divider 32.

The support sleeve 35 constitutes part of a stanchion which includes a vertical stanchion sleeve 41 attached to the support sleeve 35, and carries a vertically adjustable stanchion bar 42 having at its upper end gripper elements 43 engageable against the ceiling of the freight car to securely hold the stanchion as a unitary structure in place. Adjustment of the stanchion bar 42 to compensate for variations in the heights of different freight cars is effected by a clamp ring 44 attached to the stanchion sleeve 41 and surrounding the stanchion bar 42.

The opposed discharge ends of the divider 32 are connected to a pair of enclosed declining conveyor runways 46 which in the freight car extend in opposite directions from the car doorway C toward the two ends of the car and are disposed closely adjacent the inner face of the adjacent side wall of the car. These runways are made up from a plurality of connected telescoping runway sections 47 as shown in Fig. 8. Each section 47 comprises two short lengths of runway defined by longitudinal guide rails 48, 49 arranged to support and guide the rolling cans A and disposed parallel and closely adjacent each other so that the rails 48 slide axially along the rails 49 and thus provide for elongating or shortening the sections as desired. The rails 48 are tied together at their ends by tie rings 51 which surround the runway. The rails 49 are similarly tied together by tie rings 52.

The ends of these runway sections 47 are removably secured together by pins 54 (Fig. 8) which are insertable in alignable lugs 55, 56 formed on the outer or end tie rings 51, 52 respectively. The sections 47 of the runways 46 are alignable endwise by short plates 58 which project from the end of the tie ring 51 and by extensions 59 of the rails 49 which project beyond the end tie ring 52 (see Fig. 8). With such a construction of connected telescoping runway sections, the runways 46 may be made any length to fit any freight car and may be shortened by telescoping the various sections and by removal of sections to provide as long or as short a runway as may be required.

The discharge ends of the runways 46 are respectively connected to elbow sections 61 (Fig. 1) which are similar to the elbow section 25 to guide the cans A from the runways 46 into twister sections 62. The twister sections 62 are connected to the elbow sections 61 and are similar to the twister section 31 hereinbefore mentioned. These twister sections turn the rolling cans through an angle of 90 degrees and discharge them in a position for rolling in a direction transversely of the freight car.

The twister sections 62 discharge the cans onto the high end of a pair of slightly end-to-end inclined, substantially flat, shallow loading trays 64 (Figs. 1 and 2) which extend transversely of the freight car. There is one of these loading trays for each end of the car. Each tray is provided with a high and a low side guide 65, 66 respectively to retain the cans in a straight line procession. The low guide 66 is low enough to permit insertion of the pronged fork E into the empty cans to remove them as hereinbefore mentioned. The trays are open at their tops and closed at their low or terminal ends to stop the cans in the trays.

The trays 64 are disposed at substantially waist height of a loading operator and are mounted on portable racks 68 which extend transversely of and are substantially the same width as the freight car. One of the racks 68 is shorter than the other so that they can telescope one within the other as shown in Figs. 4, 5 and 6. Each rack 68 preferably comprises a pair of spaced and parallel triangular shaped vertical end support frames 71 preferably made of angle iron and connected at their tops or apexes by a crossbar 72. The backs of the frames 71 preferably are vertical while the fronts slope upwardly and inwardly as shown in Fig. 1.

The crossbar 72 is high enough to clear an operator standing between the end frames. The sloping front member of each of the end frames 71 carries hinge lugs 74 which are hingedly connected to a pair of arms 75 which extend out from the frames 71 in a substantially horizontal position. The outer ends of these arms 75 are connected to the ends of the loading trays 64. Thus the loading trays 64 may be hinged upwardly against the sloping front of the rack end frames 68 as shown in Fig. 6 to form a compact unit for passage of the rack through a doorway C. When in operating position as shown in Fig. 1 the space entirely around, above and below and at the ends of each tray 64 is completely unobstructed for the manipulation of the pronged loading fork E in any direction in front of the trays.

The racks 68 further are mounted on rollers 77 to provide for mobility of the apparatus. These rollers 77 are carried in swivel plates 78 (see Fig. 7) which are rotatable on pivot pins 79 secured in the bottom of the end frames 71. The plates 78 are locked in one of two positions by locking pins 81 disposed in a hole 82 in the frames 71 and inserted in one of two holes 83 in the swivel plate. In this manner the rollers may be set for movement of the racks 68 endwise through the car doorways C and after entering the car may be set for movement of the racks longitudinally of the car without turning the racks. This locking of the rollers also facilitates moving the racks in a straight line.

In operation, the racks 68 are positioned in the opposite ends of the freight car B with the loading trays 64 facing the respective ends of the car and extending transversely thereof as shown in Fig. 3. An operator stands under each of the racks 68 with the tray 64 in front of him so that he faces the end of the car. As the cans A roll in a substantially continuous procession onto the loading tray 64 in front of him, the operator scoops them up with the pronged fork E and stacks them up in front of and beyond the tray, against the end wall of the car in rows extending transversely of the car from one side wall to the other and vertically from the floor to the ceiling in the conventional manner. With the loading tray 64 directly in front of him at all times, the operator avoids needless walking and can therefore quickly stack the cans in proper position. The unobstructed region around the loading tray permits the operator unrestricted freedom in placing the cans under and above the tray where and how he requires them.

As the ends of the car progressively become filled with cans, the operators push the racks 68 back toward the center of the car and continue their stacking operations freely until the entire car is filled up to the edges of the doorway C. During this loading progress and as the racks 68 are pushed back, the sections 47 of the conveyor runways 46 telescope sufficiently to permit this travel, and when fully telescoped or as otherwise required, said sections may be removed to shorten the runways and thus permit free travel of the racks towards one another.

At the car doorways C, the racks 68 telescope one within the other as shown in Figs. 4 and 5 and thus permit the operators to continue their stacking to the very edge of the doorways. The space between the doorways must be left clear when the car is full. At the completion of the loading operation the arms 75 on the racks 68 are hinged upwardly as shown in Fig. 6 to position the loading trays against the racks so the racks may be removed endwise from the car through either doorway C.

Thus with such a loading apparatus, the operators are supplied with cans at a convenient location and can readily stack them in the conventional manner without excessive walking and undue fatigue.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An apparatus for manually bulk loading sheet metal cans into freight cars and other restricted places for shipment or storage, comprising in combination, a portable rack of substantially the same width as a freight car for arrangement in the car transversely thereof, said rack being movable manually from one end of the car toward the other, a substantially flat shallow tray inclined from end-to-end mounted on said rack at substantially waist height of a manual packing operator for receiving cans rolling on their sides and for supporting them in a continuous line, said tray extending transversely of the car and being unobstructed above and below so that an operator standing behind the tray can readily lift the cans from the tray and stack them in front of the tray in transverse rows in the end of the car unobstructed and without extensive walking, and means for conveying the cans in a substantially continuous procession to the high end of said inclined tray to keep said tray filled with cans to be stacked in the car, said can conveying means comprising a plurality of rigid telescoping can runway sections extending longitudinally of the car from a side doorway thereof and connecting with an end of said tray, whereby to permit the latter and said rack to be manually moved as aforesaid longitudinally of the car without interrupting the continuous delivery of cans to said tray.

2. An apparatus of the character defined in claim 1 wherein the tray is hingedly mounted on said rack and is hingeable into a position flat against said rack to facilitate movement of said rack into and out of a freight car through a restricted doorway.

3. An apparatus of the character defined in claim 1 wherein said rack is mounted on rollers having swivel heads rotatable relative to said rack for facing the rollers in at least two angularly disposed directions to facilitate movement of the rack in said directions, and means for locking said swivel heads in an adjusted position to facilitate movement of the rack in a straight line in a set direction.

4. An apparatus for manually bulk loading sheet metal cans into freight cars and other restricted places for shipment or storage, comprising in combination, a pair of portable racks of substantially the same width as a freight car for arrangement in the car transversely thereof, said racks being movable manually from the ends of the car toward the center at the doorway of the car and being adapted to telescope one within the other at said doorway to provide for their maximum movement within and longitudinally of said car, a substantially flat shallow tray inclined from end-to-end mounted on each of said racks at substantially waist height of a manual packing operator for receiving cans rolling on their sides and for supporting them in a continuous line, said trays extending transversely of the car and being unobstructed above and below so that operators standing behind said trays can readily lift the cans from the trays and stack them in front of the trays in transverse rows in the ends of the car unobstructed and without extensive walking, and means for conveying the cans in substantially continuous processions to the high ends of said inclined trays to keep said trays filled with cans to be stacked in the car.

5. An apparatus for manually bulk loading sheet metal cans into freight cars and other restricted places for shipment or storage, comprising in combination, a pair of portable racks of substantially the same width as a freight car for arrangement in the car transversely thereof, said racks being movable manually from the ends of the car toward the center at the doorway of the car, a substantially flat shallow tray inclined from end-to-end mounted on each of said racks at substantially waist height of a manual packing operator for receiving cans rolling on their sides and for supporting them in a continuous line, said trays extending transversely of the car and being unobstructed above and below so that operators standing behind said trays can readily lift the cans from the trays and stack them in front of the trays in transverse rows in the ends of the car unobstructed and without extensive walking, a runway for conveying the cans into the car by gravity in a substantially continuous procession, a divider at the terminal end of said runway for dividing said procession of cans into two processions and for directing said processions in opposite directions, and a pair of runways comprising telescoping and connected removable runway sections extending from said divider to the high ends of said inclined trays to direct said processions of cans into said trays.

6. An apparatus of the character defined in claim 5 wherein there is provided an adjustable stanchion insertable in the car between its floor and its ceiling, a support on said stanchion for carrying said divider, said support being adjustable to elevate said divider and the adjacent ends of said telescoping runways connected thereto to control the speed of the movement of the cans passing therethrough, and hingeable elbow sections at the ends of said telescoping runways and connected to said divider and said trays to facilitate elevation of the divider ends of said runways.

7. An apparatus for manually bulk loading sheet metal cans into freight cars and other restricted places for shipment or storage, comprising in combination, a pair of portable open racks of substantially the same width as a freight car for arrangement in opposite ends of the car transversely thereof, said racks each including spaced parallel support frames disposed at the opposite ends thereof to provide a clear unobstructed space therebetween to accommodate a manual operator, said racks respectively being movable toward and away from each other longitudinally of the car, a tray mounted at its opposite ends on each of said rack frames and extending across a said rack between said frames at substantially waist height of a manual packing operator for receiving and supporting cans fed thereto in a continuous procession, said trays being unobstructed above and below so that an operator standing within a said rack behind its associated tray can readily lift the cans from the tray and stack them in front of the tray in transverse rows in the end of the car without extensive walking, and means for conveying the cans to said trays comprising a plurality of rigid telescoping can runway sections extending in opposite directions longitudinally of the car from a side doorway thereof and connecting with the ends of said trays to permit the latter and said racks to be moved toward and away from each other as described without interrupting the feed of cans to said trays.

8. An apparatus of the character defined in claim 7 wherein a said tray at its ends is mounted on arms projecting from and hingedly connected to said support frames of the associated rack to provide for unobstructed support of said tray and to provide for hinging said tray flat against said rack for moving said rack and tray as a unit into and through doorways and the like limited spaces.

References Cited in the file of this patent

UNITED STATES PATENTS

| | | |
|---|---|---|
| 1,586,485 | Swanson et al. | May 25, 1926 |
| 1,711,820 | Wilcke | May 7, 1929 |
| 1,898,120 | Farmer | Feb. 21, 1933 |
| 2,097,368 | Frank | Oct. 26, 1937 |
| 2,465,206 | Davis | Mar. 22, 1949 |
| 2,561,377 | Jones | July 24, 1951 |

FOREIGN PATENTS

| | | |
|---|---|---|
| 424,166 | Germany | Jan. 20, 1926 |